United States Patent [19]

[11] 3,906,155 van Straaten

[45] Sept. 16, 1975

[54] CIRCUIT ARRANGEMENT FOR GENERATING A CONTROL SIGNAL FOR THE FIELD OUTPUT STAGE IN A TELEVISION RECEIVER

[75] Inventor: Jan van Straaten, Nijmegen, Netherlands

[73] Assignee: U.S. Philips Corporation, New York, N.Y.

[22] Filed: June 1, 1973

[21] Appl. No.: 366,056

[30] Foreign Application Priority Data

June 15, 1972 Netherlands .................. 7208147

[52] U.S. Cl. .................. 178/69.5 TV

[51] Int. Cl.² .................. H04N 5/04

[58] Field of Search .................. 178/69.5 TV, 69.5 G; 328/46, 48, 55; 179/15 BS

[56] References Cited

UNITED STATES PATENTS

| | | | |
|---|---|---|---|
| 3,484,699 | 12/1969 | Israel | 328/46 |
| 3,567,857 | 3/1971 | Lynn | 178/69.5 N |
| 3,688,037 | 8/1972 | Ipri | 178/69.5 TV |
| 3,691,296 | 9/1972 | Marshman | 178/69.5 F |
| 3,691,297 | 9/1972 | Merrell et al. | 178/69.5 TV |
| 3,708,621 | 1/1973 | Yamamoto | 178/69.5 TV |
| 3,751,588 | 8/1973 | Eckenbrecht et al. | 178/69.5 TV |

*Primary Examiner*—Robert L. Griffin
*Assistant Examiner*—George G. Stellar
*Attorney, Agent, or Firm*—Frank R. Trifari; Henry I. Steckler

[57] ABSTRACT

A circuit arrangement for generating a control signal for the field output stage in a television receiver provided with a frequency divider circuit with which the double line frequency is divided either by a number which is equal to the number of lines per image or by a number which deviates from this number. The choice between the two divisors is made by a storage element dependent on the on-phase state or the off-phase state of the received field synchronizing pulses and the divider pulses. Resetting of the frequency divider circuit is therefore realised by the store and not by the received pulses, which results in less sensitivity to interference. Since there are two states, a small brightly lit image no longer occurs. In the case of the nominal divisor, the divider pulse is extended. When receiving non-standard signals (for example, from video recorders) direct synchronisation is used with the divisor being larger than the nominal divisor.

10 Claims, 9 Drawing Figures

Figure 1:
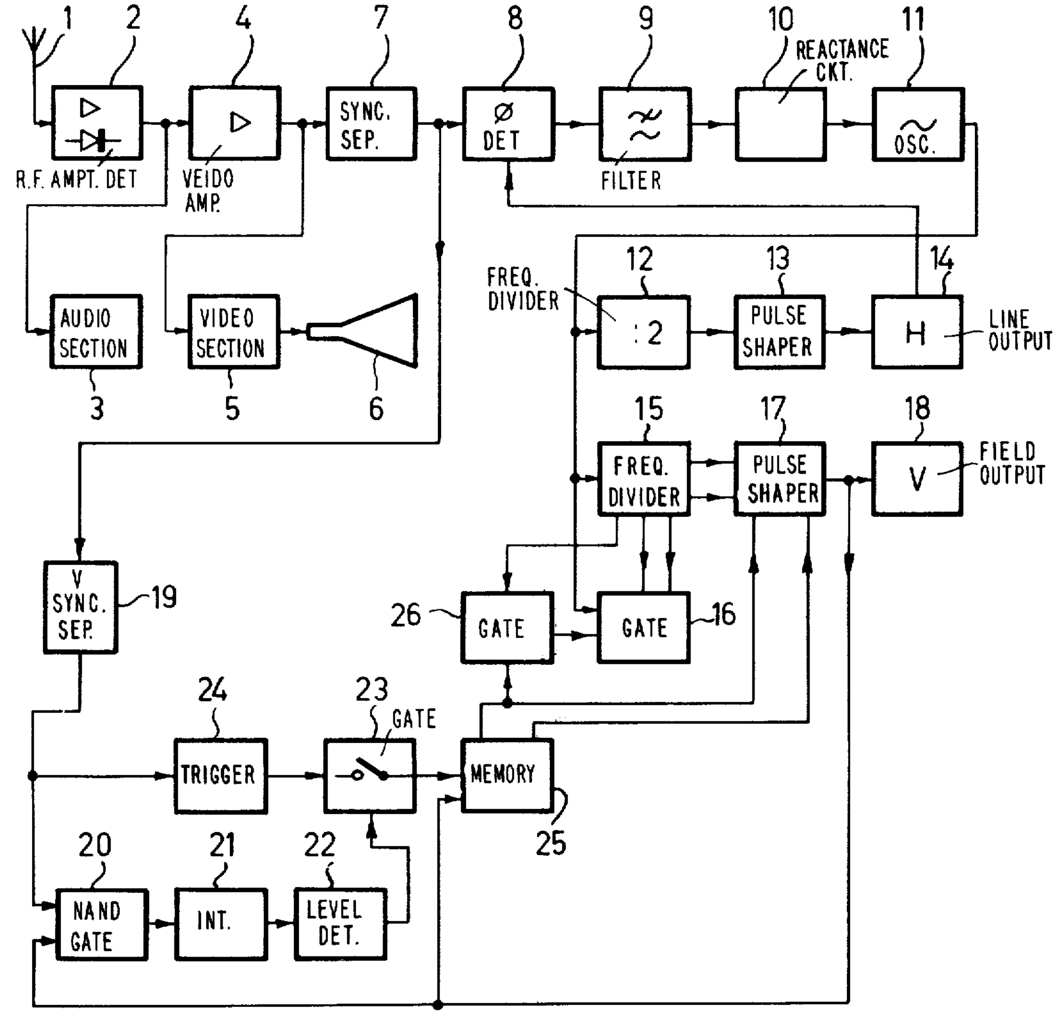

CIRCUIT ARRANGEMENT FOR GENERATING A CONTROL SIGNAL FOR THE FIELD OUTPUT STAGE IN A TELEVISION RECEIVER

The invention relates to a circuit arrangement for generating a control signal for the field output stage in a television receiver suitable for the reception of line and field synchronising pulses in which a number of fields constitutes a picture, provided with a generator for generating a signal of the double line frequency, a frequency divider circuit and means for applying received field synchronising pulses to a comparator stage for comparing the phase between these pulses and the pulses generated by the frequency divider circuit, the comparator stage being capable of applying a signal to a gate which signal is dependent on the phase difference between the compared pulses.

A circuit arrangement of this kind is described in U.S. Pat. No. 3,708,621. Since in this known circuit arrangement the control signal is derived by frequency division from the line synchronising signal, its frequency is correct as soon as the line synchronising circuit has pulled in in frequency which is usually effected at a comparatively fast rate. The comparator stage which may be formed as a coincidence stage and an integrator ensure the correct phase of the received field control signal relative to the field synchronising pulses originating from the transmitter and received by the television receiver. In the off-phase condition the comparator stage provides a pulse during the occurrence of a pulse originating from the frequency divider circuit. When the integrator, which may be a counter, has received a given number of these pulses, it in turn applies a signal which enables the gate. The frequency divider circuit, which consists of a plurality of bistable elements, is then reset in that one of the received field synchronising pulses is passed by the gate. The phase is then correct, the comparator stage no longer supplies any pulse and the received synchronising pulses can in principle no longer reach the divider circuit, at least not as long as the signal generated by the circuit arrangement maintains the same frequency and the same phase as the received pulses.

The known circuit arrangement has the following drawbacks. Firstly, at the instant when the frequency divider circuit is reset, the vertical deflection discontinues and subsequently commences again which means that one vertically directed deflection lasts shorter than the others. When this deflection is very short or when, in contrast, is almost as long as a normal deflection, i.e. 20 ms in a television system using 50 fields per second, this is not a very great drawback. When, however, the shorter deflection lasts, for example, 10 ms, the mean level of the sawtooth current flowing through the field deflection coil is shifted considerably which may result in the transistors of the field output stage providing the said current being cut off for a given period. A brightly lit horizontal line then appears on the display screen of the receiver which is disturbing for the observer and which may be harmful for the screen.

Secondly, in the case when the received signal is weak, the coincidence stage not only receives the useful field synchronising pulses originating from the transmitter but also noise and interferences. It may then occur that the coincidence stage receives too little information during the occurrence of the synchronising pulses which may be observed as the off-phase condition. The gate may therefore be enabled at any arbitrary instant so that interferences can directly influence the frequency divider circuit and cause a wrong phase. Also the divider circuit may at any instant be reset so that the vertical deflection can commence and end at any instant. The height of the image displayed then continuously varies and may be very small if interferences succeed each other at a fast rate. This has the same disturbing effect as that described above.

An object of the invention is to obviate the said drawbacks and, to this end, the circuit arrangement according to the invention is characterized in that the frequency divider circuit, dependent on the output signal from the gate is switchable under the control of a memory element between two states having different divisors, to wit a first state whereby the divisor is equal to the number of lines per image and a second state whereby the divisor deviates from said number, whereby the memory element brings and maintains the frequency divider circuit in its first state when the compared pulses at least partly coincide and brings it to the second state when the compared pulses have not coincided for a given period.

The invention is based on the recognition of the fact that the said drawbacks of the known circuit arrangement are caused in that the received field synchronising pulses can be directly applied to the frequency divider circuit. According to the invention, no received signal and hence no interference can directly reach the divider circuit. This may be compared with the known circuit arrangements in which a field oscillator to be synchronised is used instead of a divider circuit (or a counter). In these circuit arrangements, the oscillator initially receives the received field synchronising pulses (direct synchronisation) until the frequency and the phase of the generated signal are correct. Subsequently, the direct path is completely or partly cut off while the frequency and the phase are always recontrolled (indirect synchronisation) unless the off-phase condition occurs again for some reason or other. In the known circuit arrangement referred to in the U.S. patent mentioned hereinbefore a direct synchronisation is used only once for resetting for the case where the off-phase condition (= non-coincidence) has taken longer than a given period whereafter the frequency divider circuit operating as a field generator does not receive anything anymore unless, as has been explained, the received signal is weak. In the circuit arrangement according to the invention which is also provided with a frequency divider circuit, this divider circuit is not adjusted by an external signal. This again is an indirect synchronisation, but one which is only active in the off-phase condition and is thereafter no longer active. The circuit arrangement according to the invention therefore has the advantage of the circuit arrangements employing indirect synchronisation, i.e. the greater insensitivity to interference, as well as the advantage of generating the field frequency by means of frequency division, i.e. obtaining substantially immediately the exact frequency of the control signal applied to the field output stage.

Moreover, since the frequency divider circuit in the circuit arrangement according to the invention has two states with different dividers which are dependent on the output voltage of the gate, that is to say, on the fact whether the received and generated signals of field frequency are either in phase or not in phase (= coincidence), the above described interfering phenomena cannot occur. In fact, it is obvious that the second divider will in practice be chosen sufficiently closely to the first one in order that switching over from one to the other divider cannot result in an image having a small height and a strong brightness.

A further aspect of the invention is that the relevant circuit arrangement is alternatively suitable for the reception of "non-standard signals", i.e. signals in which the number of lines per image deviates from the number prescribed for the relevant television system. Such signals are generated by some test signal generators or may be produced when using video recorders. An embodiment of the circuit arrangement according to the invention makes synchronisation in such a case possible as well, whereby the direct synchronisation is used. To this end, the circuit arrangement according to the invention is characterized in that the memory element comprises a bistable element receiving reset pulses when the compared pulses at least partly coincide and receiving set pulses when the compared pulses have not coincided for a given period, while the divider in its second state is larger than that in its first state, means being provided by which the bistable element in the memory element cannot receive reset pulses, while the frequency divider circuit is adjustable by means of received field synchronising pulses.

Figure 2:
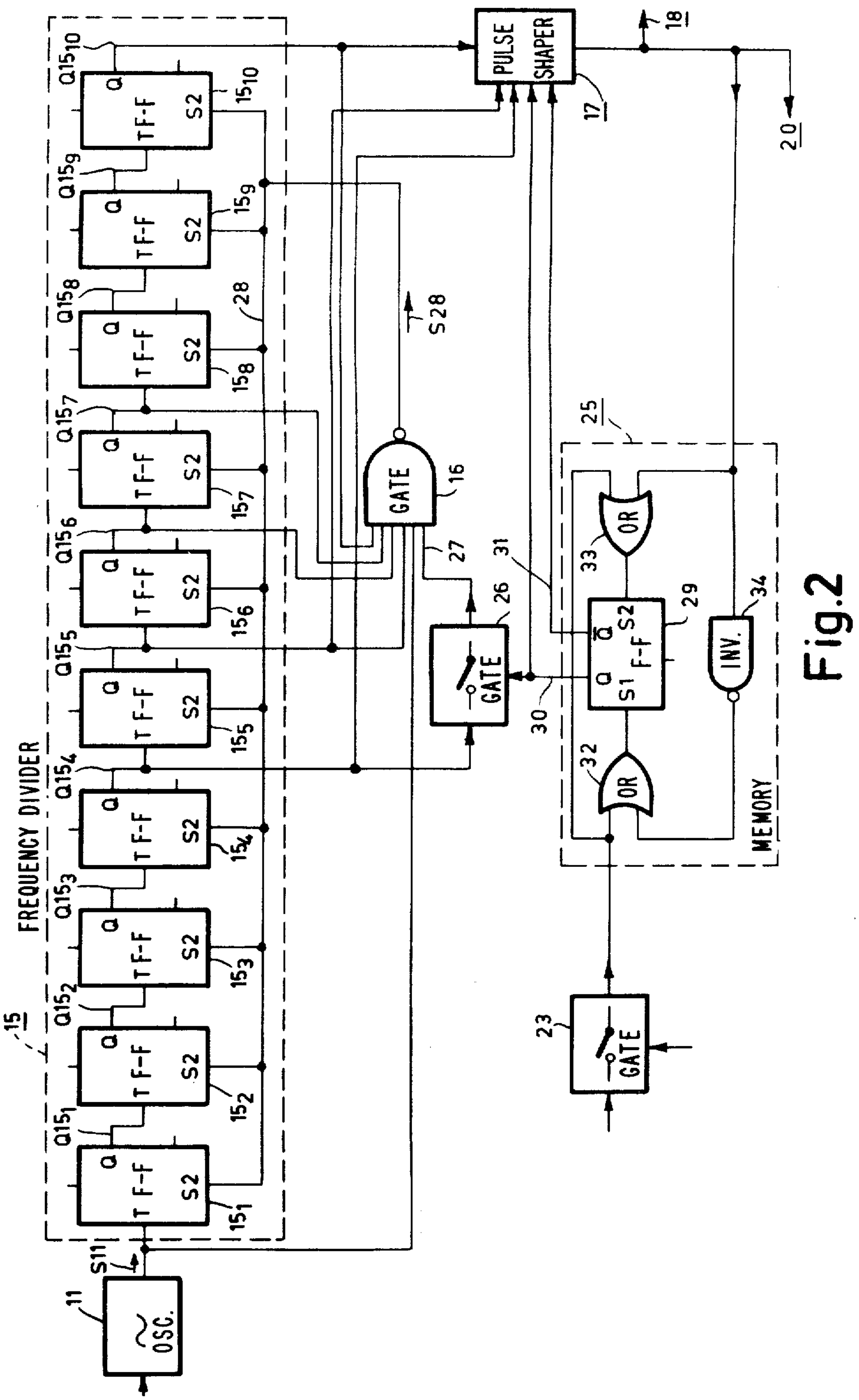
Figure 6:
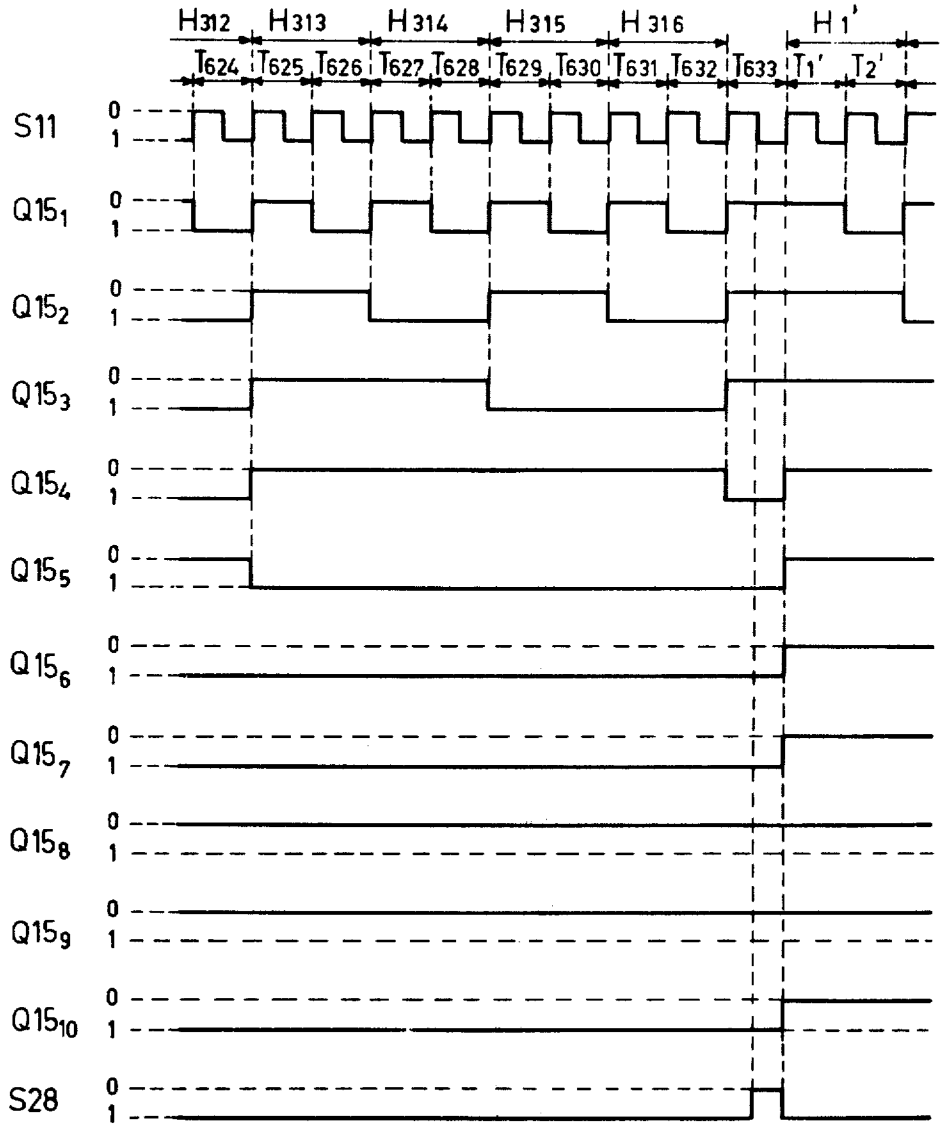
Figure 7:
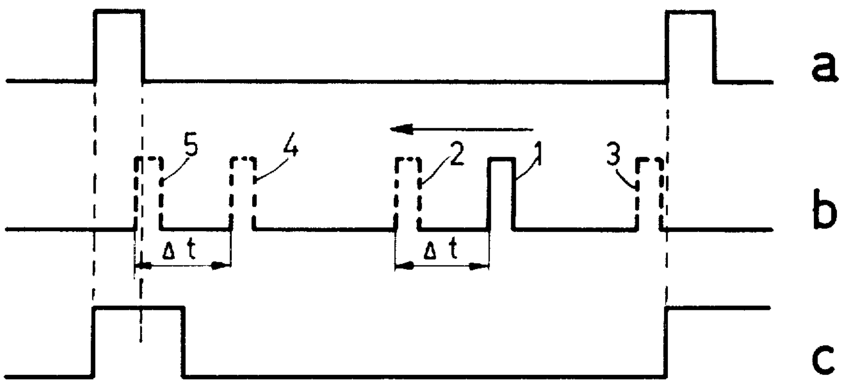
Figure 8:
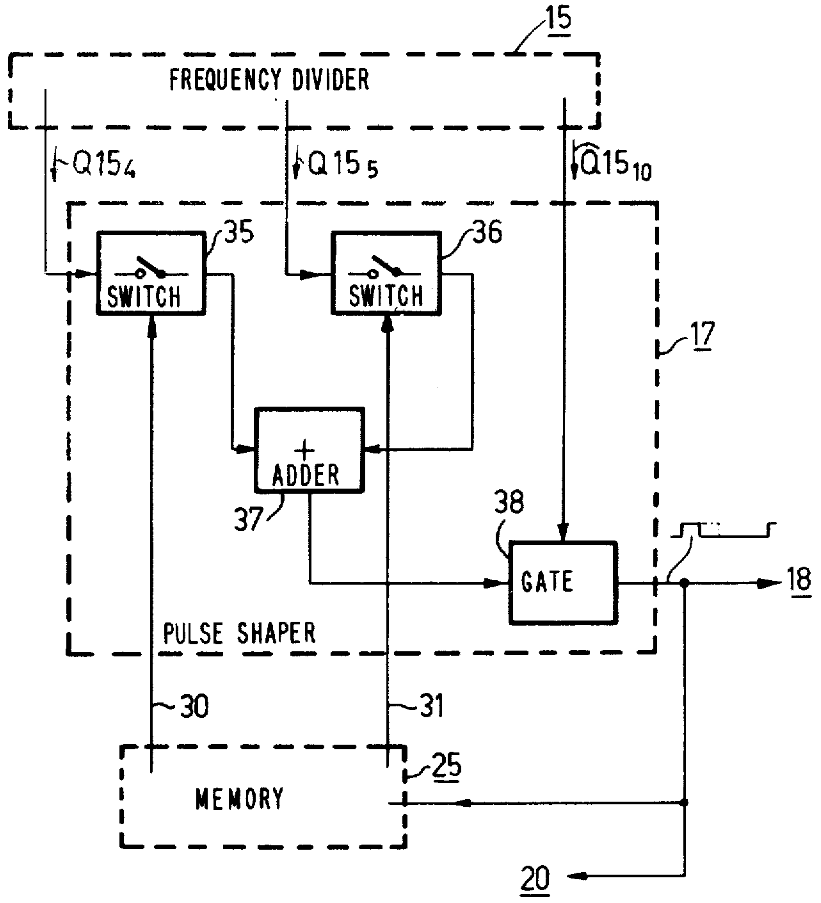
Figure 9:
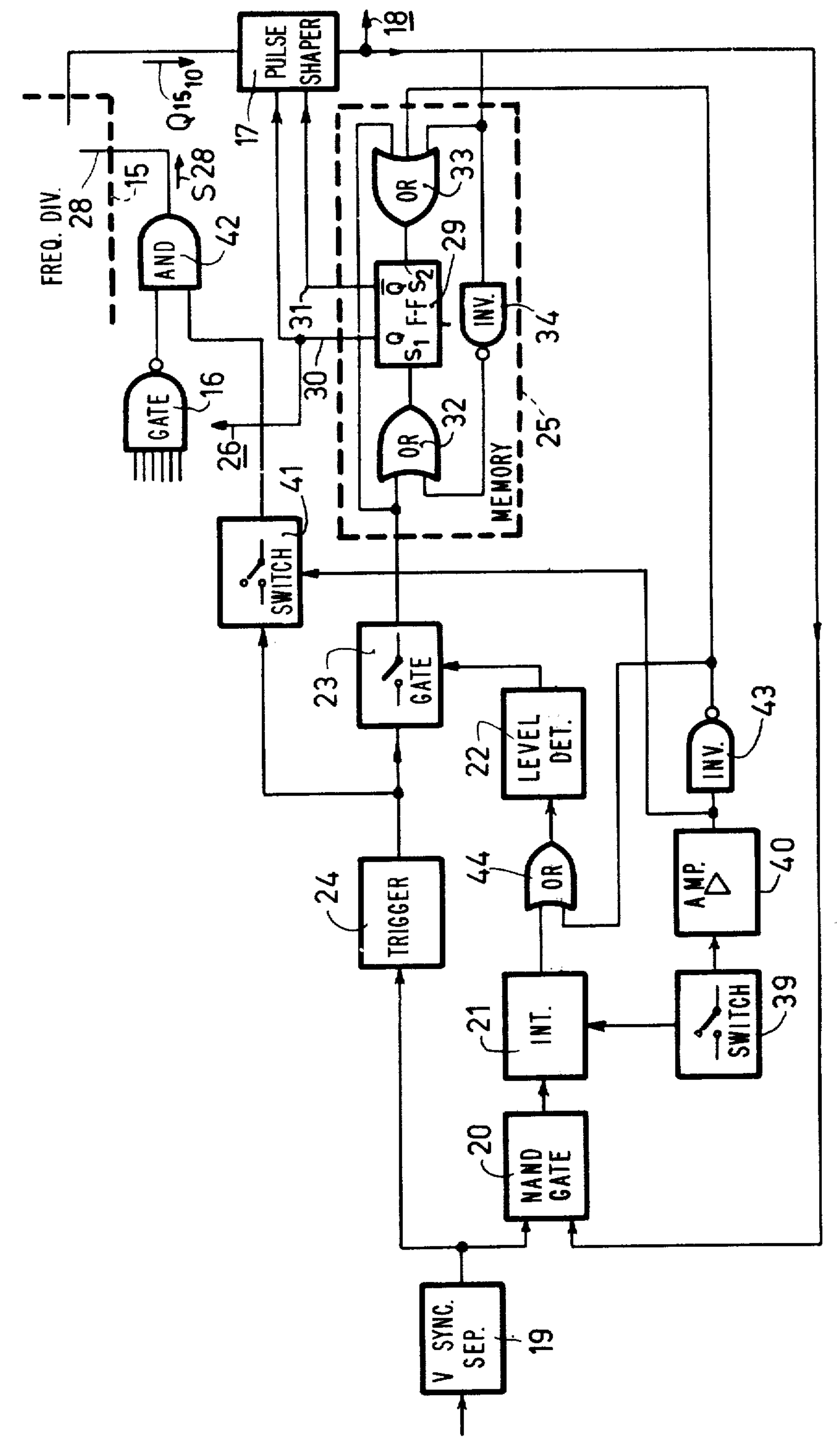

The invention will be described in greater detail by way of example with reference to the accompanying Figures, in which, FIG. 1 shows a block schematic diagram of a television receiver provided with a circuit arrangement according to the invention, FIG. 2 shows part of the circuit arrangement according to the invention, FIGS. 3, 4, 5, 6 and 7 show waveforms which occur in the circuit arrangement according to the invention, FIG. 8 shows a further part of the circuit arrangement according to the invention and FIG. 9 shows part of a second embodiment of the circuit arrangement according to the invention.

In FIG. 1, 1 denotes an aerial with which a television signal can be received. This signal is applied to an RF and detection section 2. The detected signal subsequently reaches at one end the sound section 3 of the television receiver and at the other end a video amplifier 4 at whose output a complete video signal, possibly with a chrominance signal in the case of colour television, is available. This signal is applied to a section 5 in which it is processed whereafter a picture display tube 6 is driven as well as a synchronising separator 7. The output voltage thereof comprises line synchronising pulses which are applied to a phase detector 8 whose output voltage can influence an oscillator 11 through a fly-wheel filter 9 and a reactance circuit 10. Oscillator 11 generates a voltage of double the line frequency $2f_H$, i.e. 31250 Hz in case of reception of a signal in accordance with a television system employing 625 lines per complete image, 2 interlaced rasters per image and 50 fields per second. Another possibility is that oscillator 11 generates a voltage of the line frequency $f_H$ whose frequency is subsequently doubled. The voltage of the frequency $2f_H$ controls a frequency divider circuit 12 in which its frequency is divided by two and the signal thus obtained is applied through a pulse shaper 13 to the line output stage 14 which provides the line deflection current for the deflection coil (not shown) for the horizontal deflection of the electron beam(s) in tube 6.

The voltage available at the output of oscillator 11 also controls a frequency divider circuit 15 in which its frequency is divided by the divisor 625 in a first state and by another divisor in the second state. When oscillator 11 has the correct frequency, i.e. after frequency pull-in of the circuit 8, 9, 10, 11 for the indirect line synchronisation, the frequency of the signal generated by the divider circuit 15 is correct, that is to say, it is equal to the field frequency, in case of the given standard of 50 Hz, if the divider circuit is in its first state. An adjusting gate 16 ensures that the divider has the correct value. A pulse shaper 17 receives the signal generated by the divider circuit 15 and controls the field output stage 18 which applies the field deflection current to the deflection coil (not shown) for the vertical deflection of the electron beam(s) in tube 6. The two pulse shapers 13 and 17 ensure that the line and the field control signal acquire the waveform for stages 14 and 18, respectively.

The output voltage from synchronising separator 7 also comprises field synchronising pulses which are separately obtained by means of a field synchronising separator 19 whereafter they are applied to an input of a coincidence stage 20. The divider pulses originating from the output of pulse shaper 17 are present at a second input of said stage. In the on-phase state, that is to say, in the case where a field synchronising pulse originating from the separator 19 and a divider pulse at least partly coincide, stage 20 does not provide a signal. In the offphase state, it provides a signal, namely the divider pulse to an integrator 21 which is followed by a level detector 22. When this state lasts at least approximately 0.4 s, which corresponds to approximately 20 pulses, the detected level exceeds a given threshold level so that a gate 23 formed as control switch starts to conduct. The field synchronising pulses at the output of separator 19 are also applied to a trigger 24 which, for example, by means of differentiation, generates pulses whose leading edges coincide with those of the synchronising pulses. When switch 23 conducts, some of these pulses are passed and they reach according to the invention a memory element 25. Memory element 25 influences adjusting gate 16 through a gate 26 in a manner which will be described hereinafter with the result that the on-phase state occurs. Coincidence stage 20 then does not provide a pulse so that switch 23 is cut off. Element 25 influences also pulse shaper 17 as will be described hereinafter.

FIG. 2 shows in greater detail the parts 15, 16, 25 and 26 of the circuit arrangement according to the invention. In this embodiment, frequency divider circuit 15 consists of ten bistable elements, in this case flipflops $15_1$, $15_2$, . . . $15_{10}$ which are formed in known manner and each of which divides by two. In order that divider circuit 15 is reset after the 625th period of the signal with the frequency $2f_H$ to the initial position, i.e. the position at the commencement of the first period, the outputs of oscillator 11 and of flipflops $15_5$, $15_6$, $15_7$ and $15_{10}$ are connected to five inputs of the adjusting gate 16 formed as a NAND gate, while gate 26 is connected to a sixth input 27 thereof.

Figure 3:
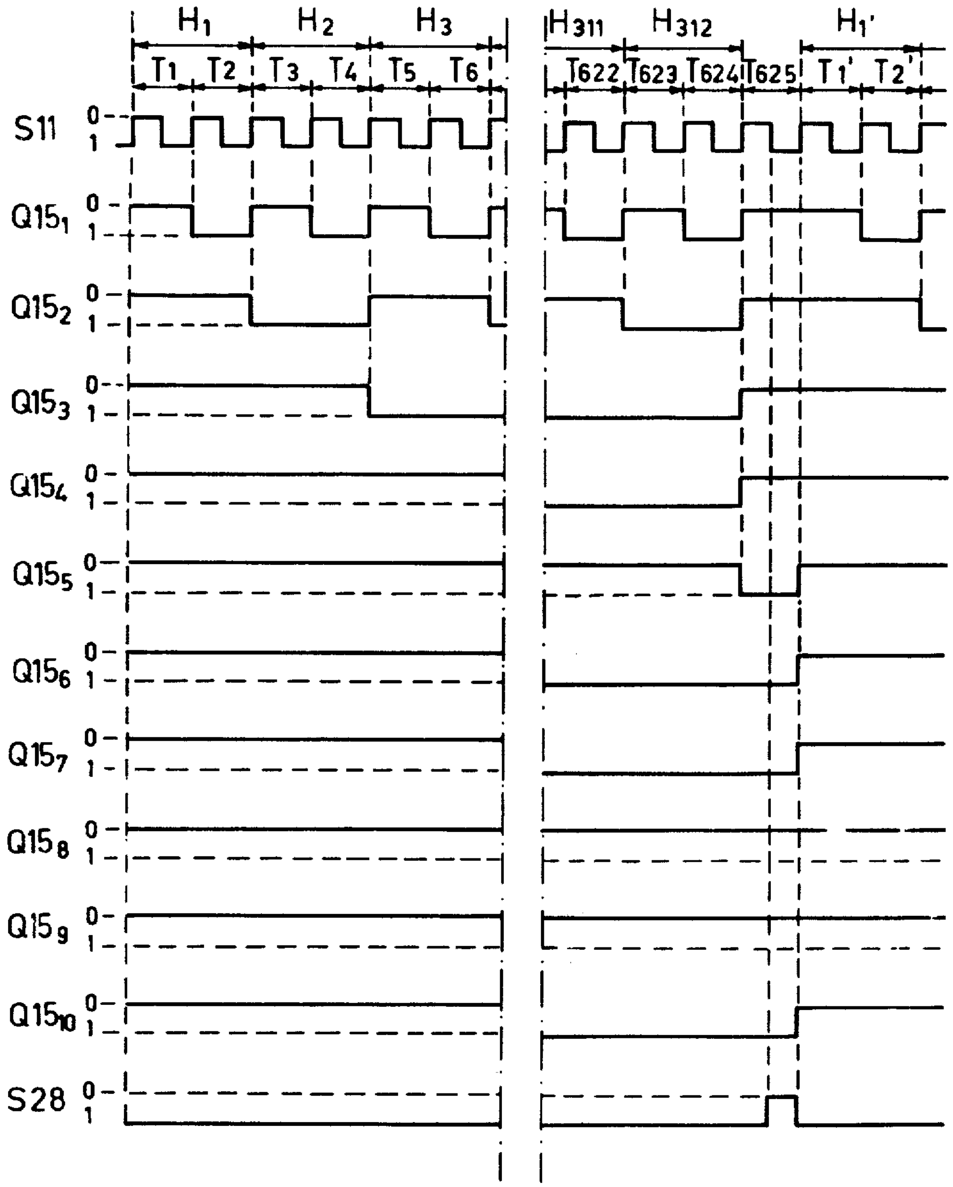
Figure 4:
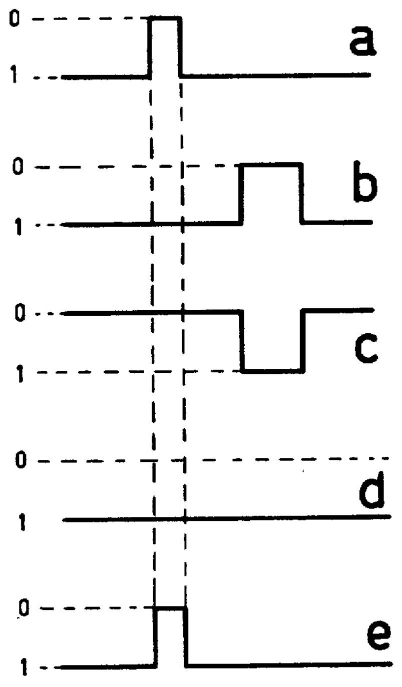
Figure 5:
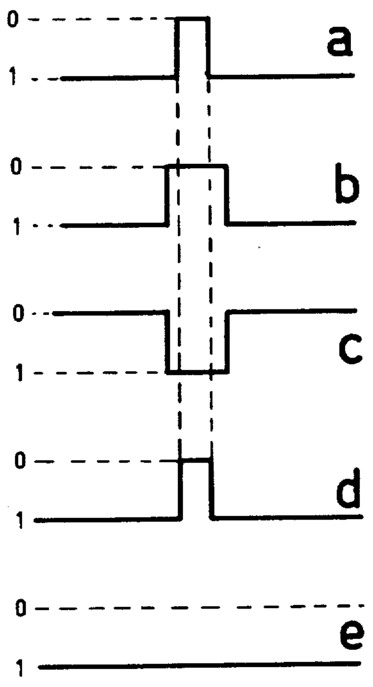

FIG. 3 shows the operation of divider circuit 15 and adjusting gate 16 in which input 27 is initially left out of consideration, FIG. 3 shows the output signal S11 from oscillator 11 as well as the output signals $Q15_1$, $Q15_2$, . . . $Q15_{10}$ from flipflops $15_1$, $15_2$, . . . $15_{10}$ and the signal S28 at the reset line 28 of the flipflops, which line connects the reset terminals ($S_2$) of all flipflops of divider circuit 15 and which is connected to the output of gate 16. The numbers $T_1$, $T_2$, . . . $T_{623}$, $T_{624}$, $T_{625}$ indicate the periods of signal S11, while $H_1$, $H_2$, . . . $H_{311}$, $H_{312}$ indicate the corresponding line periods. For the raster commencing after period $T_{625}$ the notations $T'_1$, $T'_2$, . . . and $H'_1$ apply. Each flipflop reverses when a leading edge occurs in the output signal from the previous flipflop or from signal S11.

At the commencement of period $T_1$, signals S11, $Q15_1$, $Q15_2$, . . . $Q15_{10}$ are "high" which may be indicated by the binary number 0. At the commencement of period $T_2$, flipflop $15_1$ reverses, signal $Q15_1$ becomes "low" which corresponds to the number 1. FIG. 3 shows that for the first six periods the flipflops indicate the following:

$T_1$ : 0000000000
$T_2$ : 0000000001
$T_3$ : 0000000010
$T_4$ : 0000000011
$T_5$ : 0000000100
and
$T_6$ : 0000000101 in which signals $Q15_1$, $Q15_2$, . . . $Q15_{10}$ are written from the right to the left. These are the numbers 0, 1, 2, 3, 4 and 5 in the decimal system, that is to say, the number of the corresponding period reduced by 1. For the periods $T_{622}$, $T_{623}$, $T_{624}$ and $T_{625}$ the flipflops indicate the following:

$T_{622}$ : 1001101101
$T_{623}$ : 1001101110
$T_{624}$ : 1001101111
and
$T_{625}$ : 1001110000.

These are the numbers 621, 622, 623 and 624.

It is evident that gate 16 has received at least one 0 at one of its input up to the first half of period $T_{625}$. FIG. 3 shows that during the second half of period $T_{625}$ signals S11, $Q15_5$, $Q15_6$, $Q15_7$ and $Q15_{10}$ are simultaneously equal to 1 so that signal S28 becomes equal to 0. The pulse thus generated is applied as a reset pulse through line 28 to all flipflops of divider circuit 15. The flipflops which were not in the high state, i.e. flipflops $15_5$, $15_6$, $15_7$ and $15_{10}$ are brought to that state while the other flipflops do not change their state. At the commencement of the next period, period $T'_1$, all flipflops indicate 0 and a new raster commences.

Memory element 25 includes a flipflop 29, an output 30 of which is connected to an input of gate 26 while another input of gate 26 is connected to the output of flipflop $15_4$. The outputs of an OR gate 32 and of an OR gate 33 are connected to the set ($S_1$) and the reset terminal ($S_2$), respectively, of flipflop 29. The output signal Q from flipflop 29 is present at output 30 and the other output signal $\overline{Q}$ is present at the other output 31 thereof. The output signals from switch 23 and pulse shaper 17 are applied to gate 33 while the output signals from switch 23 and an inverter stage 34 are applied to gate 32, while stage 34 reverses the output signal from pulse shaper 17 in its polarity.

In the off-phase state, received pulses are passed by switch 23 (FIG. *4a*) which do not coincide with the divider pulses (FIG. *4b*) originating from pulse shaper 17. Consequently, gate 33 does not provide a signal (FIG. *4d*). However, gate 32 receives the pulses of FIG. *4b* and the pulses of FIG. *4c* which are inverted relative thereto so that this gate is enabled. The first of the output pulses from gate 32 (FIG. *4e*) sets flipflop 29 whose output signals consequently become Q = 1 and $\overline{Q}$ = 0. If flipflop 29 were already in this state, nothing would be changed.

When the on-phase state has been achieved after some time, one pulse from switch 23 (FIG. *5a*) and one divider pulse (FIG. *5b*) coincide for at least a part. Gate 33 is enabled (FIG. *5d*) while gate 32 which receives the pulse of FIG. *5a* and the pulse of FIG. *5c* which is inverted relative to that of FIG. *5b* does not provide a signal (FIG. *5e*). Flipflop 29 is reset by the pulse of FIG. *5d*, that is to say, the signals Q = 0 and $\overline{Q}$ = 1 are present at terminals 30 and 31, respectively. Gate 26 is a controlled switch and does not conduct under these circumstances. The operation of divider circuit 15 therefore remains the same as has been extensively described hereinbefore. If due to the inertia of integrator 21 other pulses might be passed by switch 23, the state will not change.

In the off-phase state for which Q = 1, gate 26 conducts so that the output signal $Q15_4$ from flipflop $15_4$ is present at the input 27. FIG. 3 shows that $Q15_4$ = 0 during period $T_{625}$. Signal S28 consequently remains equal to 1 and divider circuit 15 is not reset. FIG. 6 shows the further variation. This Figure shows that only during the second half of period $T_{633}$, i.e. 8 periods later than in the on-phase state, the signals S11, $Q15_4$, $Q15_5$, $Q15_6$, $Q15_7$ and $Q15_{10}$ applied to gate 16 are all equal to 1 so that a reset pulse S28 = 0 is generated. The next period is thus the first period $T'_i$ of a new raster.

The foregoing shows that memory element 25 ensures that, dependent on the fact whether the on-phase or off-phase state has occurred, the frequency divider circuit divides the frequency $2f_H$ from signal S11 by the divisors 625 and 633 respectively. The following cases may occur:

1. on-phase state, with Q = 0 : the previous divisor was 625, Q remains 0, the on-phase state is maintained and neither the memory element nor the divider circuit are influenced;

2. on-phase state with Q = 1 : the previous divisor was 633, Q becomes 0 and the divisor becomes 625, which is the case as under 1;

3. off-phase state (longer than approximately 0.4 s) with Q = 0 : the previous divisor was 625, Q becomes 1 so that the divisor becomes 633; the pulses in FIGS. *5a* and *5b* have different repetition frequencies and are displaced relative to each other; after a given pull-in period, the on-phase state is reached which is the case as under 2;

4. off-phase state (longer than approximately 0.4 s) with Q = 1 : the previous divisor was 633 and remains so because Q remains equal to 1 which is the case as under 3.

The case under item 1 is thus always the final state in which neither any received signal nor any noise or interferences can reach the divider circuit. If the received field synchronising pulses drop out after this state has been reached the divider circuit continues to divide by 625 due to the action of the memory element so that the image displaced on the display screen of tube 6 remains in place. This is also the case with the known circuit arrangement which in fact has no other divisor than 625 but which, as already stated, is more sensitive to noise and interference with the attendant drawbacks. When the received signal is so weak that substantially no distinction can be made between interferences and field synchronising pulses or when these pulses drop out before the on-phase state is reached, the divisor 633 is used for division. The image "rolls over" in the vertical direction which is less disturbing to the observer and is less harmful for the screen than the brightly lit narrow images which can be displayed with the known circuit arrangement.

FIG. 7 shows how the pull-in process is effected, i.e. when Q = 1. FIG. 7*a* shows the output pulses from pulse shaper 17 and FIG. 7*b* shows the pulses originating from trigger 24. Since the frequency of the latter pulses ($=2f_H/625$) is higher than that of the former pulses ($=2f_H/633$), they are displaced relative thereto to the left until coincidence takes place in gates 32 and 33 : Q becomes 0; coincidence also takes place in the coincidence stage 20 and switch 23 is open. For each period of the frequency divider circuit the relative time difference $\Delta t$ between two received pulses 1 and 2 is equal to 8 times one period of signal S11, i.e. approximately 8 × 32 μs = 256 μs. One period of the frrquency divider circuit corresponds to 633 × 32/8 × 32 = 79 times $\Delta t$. In the most unfavourable case in which the process commences with the pulse in the position 3 in FIG. 7*b*, this process will therefore take approximately 75 field periods, i.e. 1.5 s. In this extreme case, which is very improbable, it takes consequently approximately 0.4 + 1.5 = 1.9 s before the displayed image comes to a standstill.

It may occur that just before the end of the pull-in process the pulse of FIG. 7*b* occupies such a position, indicated by 4, that at the next position 5 after a period of time $\Delta t$ the leading edge of the pulse occurs just before the trailing edge of the pulse of FIG. 7*a*. As a result, the divider circuit is brought to the state with the divisor 625. Since the coincidence period is then very short, it is however evident that this situation is very sensitive to interference. This drawback is obviated according to an aspect of the invention in that the duration of the pulse in FIG. 7*a* is made longer at the instant when the 625-state occurs. Information therefor may be obtained from memory element 25 which thus fulfils a second function, which information is applied to pulse shaper 17.

FIG. 8 shows pulse shaper 17 in greater detail. The outputs of flipflop $15_4$ and flipflop $15_5$ are connected to the inputs of controlled switches 35 and 36, respectively. The switches 35 and 36 are controlled by the signals at the outputs 30 and 31, respectively, of memory element 25. The outputs of switches 35 and 36 are connected to two inputs of an adder stage 37. The output signal thereof is applied to a keyed gate 38 which is keyed by the output signal $Q15_{10}$ from flipflop $15_{10}$.

A pulse shaper is required in any case. The output signal $Q15_{10}$ from the frequency divider circuit has a natural frequency of $2f_H/2^{10}$ which corresponds to a natural period of approximately 33 ms. Circuit 15 is reset approximately 20 ms after the commencement of the period, i.e. 20 − 33/2 ≈ 3.5 ms after reversal in the middle of the natural period. Signal $Q15_{10}$ therefore has a flyback period of approcimately 3.5 ms and is thus not usable as a field control signal. According to the invention, the pulse shaper has also two states. In the state with divisor 633 of the divider circuit for which Q = 1 and $\overline{Q} = 0$, switch 35 conducts while switch 36 is cut off. The output signal $Q15_4$ from flipflop $15_4$ whose natural period is equal to $2^4/2f_h \approx 512$ μs is applied to gate 38. This gate is keyed in such a manner that only the first positive half period of signal $Q15_4$ is passed, that is to say, its output signal lasts until the first trailing edge. This may be obtained in known manner with the aid of bistable elements. This is the pulse in FIG. 7*a*, it lasts approximately 256 μs from the instant of resetting divider circuit 15. Since $\Delta t \approx 256$ μs, this is exactly the duration which is at least required. As soon as the state with divisor 625 is achieved, there applies that Q = 0 and $\overline{Q} = 1$. Switch 36 then conducts while switch 35 is cut off so that the output signal from gate 38 is the first positive half period of signal $Q15_5$. This is the pulse in FIG. 7*c* and it lasts approximately 512 μs from the instant of resetting divider circuit 15. As a result, it is insured that the pulse in FIG. 7*b* in any case completely coincides therewith while the output signal from gate 38, hence from pulse shaper 17, is always suitable for controlling the field output stage 18. The flyback period thereof is in fact shorter than approximately 1 ms.

FIG. 7*b* shows that the largest possible time difference between the leading edges of the pulses is slightly shorter than approximately 256 μs, i.e. 0.256/20 ≈ 1.3 percent of a field period. This slight deviation is maintained as long as the occurred on-phase state lasts and produces a deviation in the vertical position of the image. It may be noted that this value, as well as the maximum duration of the pull-in process, emanates from the difference between the two divisors 633 and 625, i.e. $8 = 2^3$. A value different from 633 for the divider in the off-phase state may, however, be chosen. Instead of applying signal $Q15_4$ to adjusting gate 16, the supply of signal $Q15_5$ to this gate may be interrupted so that the divisor becomes $625 - 2^4 =$ 609. In this case, the time difference $\Delta t$ in FIG. 7*b* lasts approximately 16 × 32 μs = 512 μs, so that the pull-in time has been reduced by 50 percent relative to the described case with a divisor of 633 while the minimum duration of the pulse in FIG. 7*a* must also be 512 μs. The extended pulse of FIG. 7*c* then lasts at least approximately 700 μs which is still just suitable as a field control signal. The largest possible vertical deviation is then, however, doubled.

Divisors other than 633 and 609 may be obtained by applying or not applying one or more output signals from the flipflops of divider circuit 15 to adjusting gate 16. For 633 the difference from the nominal divisor 625 is equal to $+2^3$ and for 609 it is $-2^4$. The divisor 613, for example, corresponds to $-2^4 + 2^2 = -12$ and may be realised by connecting for Q = 1 the output of flipflop $15_3$ to an input of gate 16 and by interrupting the connection between the output of flipflop $15_5$ and the relevant input of gate 16. Divisors other than 625 are obtained in that the connection between at least one of the flip-flops $15_5$, $15_6$, $15_7$, $15_{10}$ to gate 16 is interrupted and/or in that at least one of the other flipflops is connected to gate 16. The considerations regarding divisor 609 have, however, shown that the choice of the second divisor cannot be limited in practice, while it is evident that in practice the second divisor should not deviate too much from the nominal divisor 625. Moreover, divisors 633 and 609 can be obtained in the easiest manner.

It is to be noted that it may occur that coincidence takes place in stage 20 but not in memory element 25 due to the shorter duration of the pulse generated by trigger 24. However, in such a case the divisor deviates from the value 625 so that the process described with reference to FIG. 7 is effected.

FIG. 9 shows another embodiment of the circuit arrangement according to the invention in which a higher value than the nominal value 625, namely 633, is chosen for the divisor in the off-phase state. This embodiment is based on the following recognition. There are some test signal generators in which the number of lines per image is not 625 but, for example, 624, so that the displayed image is not interlaced. They are used, for example, for adjusting the convergence in colour television receivers. When using video recorders, it may occur that, for example, when displaying a stationary image, the number of line synchronising pulses per image slightly deviates from 625. Field synchronisation with the known circuit arrangement is impossible when such "non-standard signals" are received. The object of the embodiment of FIG. 9 is to establish synchronisation in such a case and for this purpose the direct synchronisation is used while the frequency divider circuit is set to the state with divisor 633. Since this state corresponds to a lower frequency than the nominal one, the direct synchronisation is possible while the drawbacks thereof do not in most cases apply because the received signal often comprises little noise and interferences.

The embodiment of FIG. 9 comprises parts which also occur in those of the previous Figures and which have the same reference numerals. In FIG. 9, 39 denotes a switch which may be, for example, manually operated and which is closed when the above-mentioned non-standard signals are received. As a result, the delay introduced by integrator 21 is reduced, for example, by making a time constant associated with this integrator shorter or by switching off integrator 21 completely. Coincidence stage 20 thus does not have any effect any longer. Also, the closure of switch 39 renders the input voltage of an amplifier 40 "high" so that its output voltage likewise becomes high (= 0). Under these circumstances, a controlled switch 41 which is connected to the output of trigger 24 starts to conduct so that the pulses originating from the trigger are passed and reach an input of an AND gate 42. Another input thereof is connected to the output of gate 16 and the output thereof is connected to the reset line 28 of the ten flipflops of divider circuit 15. The output voltage from amplifier 40 is also applied to an inverter stage 43 whose output voltage is low (= 1) when switch 39 is closed and is applied to an input of an OR gate 44. Another input of gate 44 is connected to the output of integrator 21 and its output is connected to the input of level detector 22. Furthermore, the output of inverter stage 43 is also connected to an extra input of OR gate 33.

Under the circumstances described, gates 44 and 33 do not provide any signal (= 1). The output signal from level detector 22 becomes 0 so that the controlled switch 23 conducts. Synchronising pulses originating from trigger 24 are passed on to OR gate 32. If they do not already have the values Q = 1 and $\overline{Q}$ = 0 the output signals from flipflop 29 consequently become Q = 1 and $\overline{Q}$ = 0. This is the state as described with reference to FIG. 6 for which frequency divider circuit 15 should be reset after the 633rd period of oscillator 11. In fact, the output signal from gate 16 then is 0 so that signal S28 is likewise 0. Before the 633rd period, however, a received field synchronising pulse is present through switch 41 at the relevant input of gate 42 (= 0) so that S28 = 0. Divider circuit 15 is thereby reset.

When standard signals are received (that is to say with 625 lines per image) switch 39 is open so that integrator 21 has the original time constant whilst switch 41 is cut off. Received field synchronising pulses can no longer reach gate 42. The output signal from inverter stage 43 is 0 so that those from OR gates 44 and 33 only depend on the signals from integrator 21 and switch 23, respectively. The circuit arrangement of FIG. 9 operates in the same way as those of FIGS. 1 and 2. It may be noted that the extension of the duration of the divider pulse after the occurrence of the on-phase state in case of reception of non-standard signals is not effected in the embodiment of FIG. 9 because signal Q remains equal to 1. This is no drawback because in the most cases little noise and interference are received.

The so-called negative logic is employed in the foregoing. It is evident that this choice is not important for the essence of the invention. For the positive logic only the denomination of the logical gates shown in the Fig. would have to be changed in known manner.

Elements 10 to 13, 15 to 17, 20 to 26 and 39 to 44 of the described circuit arrangements, with the exception of a capacitor possibly associated with integrator 21, may be advantageously integrated in a semiconductor body. In view of the large number of components thereof, it is evident that a non-integrated embodiment would not be economical. It may be noted that the described frequency divider circuit and the memory element consist of binary elements. Embodiments of the same scope as described in the present patent application are, however, feasible, using elements of different types.

A television system employing 625 lines per image, two interlaced rasters per image and 50 fields per second has been taken as an example in the foregoing. It will be evident that modifications of the circuit arrangement according to the invention without an essential difference are possible for the reception of television signals in accordance with a different system.

What is claimed is:

1. A circuit arrangement for generating a control signal for the field output stage in a television receiver, said circuit comprising means for the reception of line and field synchronising pulses in which a number of fields constitutes an image raster, a generator means coupled to said reception means for generating a signal of the line frequency or an integer multiple thereof, a frequency divider circuit coupled to said generator means and having a first state wherein the divisor equals the number of lines per image and a second state wherein the divisor deviates from said number, a comparator stage means for continuously comparing said received field synchronization pulses with an output signal from said frequency divider having a first input means coupled to said reception means for receiving said field synchronization pulses, a second input coupled to said divider, and an output means for supplying a signal which is dependent on the phase difference between the compared pulses, a memory element means coupled to said output means for bringing and maintaining the frequency divider circuit in its first state when the compared pulses at least partly coincide and brings it to the second state when the compared pulses have not coincided for a given period, and a gate coupled between said memory and divider.

2. A circuit arrangement as claimed in claim 1, further comprising an adjusting gate means coupled to said divider and said memory element for adjusting the frequency divider circuit every time at the commencement of each raster, said adjusting gate having an input means for adjusting the frequency divider circuit by means of the memory element.

3. A circuit arrangement as claimed in claim 1, wherein the memory element comprises a bistable element means for receiving reset pulses when the compared pulses coincide at least partly and and for receiving set pulses when the compared pulses have not coincided for a given period.

4. A circuit arrangement as claimed in claim 3, wherein the divisor in the divider in the second state is larger than that in the first state, and further comprising means coupled to the bistable element in the memory element for preventing reset pulses from being received by said bistable element while the frequency divider circuit is being adjusted by means of received field synchronizing pulses.

5. A circuit arrangement as claimed in claim 1, further comprising a pulse shaper having an input coupled to said memory and an output means for applying a pulsatory output signal to the comparator stage, the memory element bringing the pulse shaper to a first state when it brings the frequency divider circuit to its first state, the duration of the output pulse from the pulse shaper in its first state being longer than in a second state to which the pulse shaper is brought by the memory element when it brings the frequency divider circuit to its second state.

6. A circuit arrangement as claimed in claim 5, wherein the frequency divider circuit comprises a plurality of serially coupled bistable elements and the pulse shaper includes a keyed gate having a first state in which it receives the output signal from a divider bistable element and a second state in which it receives the output signal from another divider bistable element, the period of the former output signal being longer than the period of the latter, the output signal from the keyed gate being the first half period of the relevant output signal after the instant of resetting the frequency divider circuit.

7. A circuit arrangement as claimed in claim 1 wherein the frequency divider circuit comprises a plurality of serially coupled bistable elements, and further comprising an adjusting gate having a plurality of inputs, the outputs of a plurality of the divider bistable elements being coupled to inputs of said adjusting gate for adjusting the frequency divider circuit at the commencement of each raster, and a controllable switch coupled between one of said plurality of inputs and one of said plurality of outputs.

8. A circuit arrangement as claimed in claim 7, wherein the difference between the two divisors is a combination of powers of 2.

9. A circuit arrangement as claimed in claim 7 wherein said memory element is coupled to said controllable switch.

10. A method comprising generating a television line frequency signal or an integral multiple thereof from a received line synchronization signal, said method comprising obtaining a field synchronization signal by frequency dividing said generated signal by a first divisor, continuously detecting lack of synchronization between said obtained field frequency signal and a received field frequency signal, changing said divisor in said dividing step to a second divisor upon detecting said lack of synchronization, and changing said divisor back to said first divisor upon detecting synchronization between said signals.

* * * * *